(12) United States Patent
Kauppinen

(10) Patent No.: US 7,738,108 B2
(45) Date of Patent: Jun. 15, 2010

(54) INTERFEROMETER

(75) Inventor: Jyrki Kauppinen, Ilmarinen (FI)

(73) Assignee: Gasera Ltd., Turku (FI)

( * ) Notice: Subject to any disclaimer, the term of this patent is extended or adjusted under 35 U.S.C. 154(b) by 73 days.

(21) Appl. No.: 10/577,463

(22) PCT Filed: Oct. 29, 2004

(86) PCT No.: PCT/FI2004/000639

§ 371 (c)(1),
(2), (4) Date: Sep. 28, 2006

(87) PCT Pub. No.: WO2005/043075

PCT Pub. Date: May 12, 2005

(65) Prior Publication Data

US 2007/0097378 A1 May 3, 2007

(30) Foreign Application Priority Data

Oct. 30, 2003 (FI) .................................. 20031581

(51) Int. Cl.
*G01B 9/02* (2006.01)
*G02B 27/00* (2006.01)
(52) U.S. Cl. ........................................ 356/455; 359/577
(58) Field of Classification Search .............. 356/451, 356/455, 450; 250/339.07–339.09; 359/577
See application file for complete search history.

(56) References Cited

U.S. PATENT DOCUMENTS

| 2,571,937 | A | | 10/1951 | Peck | |
|---|---|---|---|---|---|
| 3,437,397 | A | | 4/1969 | Humphrey | |
| 3,868,185 | A | * | 2/1975 | Genzel et al. | ............... 356/451 |
| 4,383,762 | A | | 5/1983 | Burkert | |
| 4,915,502 | A | * | 4/1990 | Brierley | ...................... 356/455 |
| 5,066,990 | A | * | 11/1991 | Rippel | ......................... 356/455 |
| 5,148,235 | A | * | 9/1992 | Tank et al. | .................. 356/455 |
| 5,159,405 | A | * | 10/1992 | Ukon | ......................... 356/455 |
| 5,309,217 | A | * | 5/1994 | Simon et al. | ................. 356/455 |
| 5,313,269 | A | * | 5/1994 | Ponce et al. | ................. 356/455 |
| 5,331,399 | A | * | 7/1994 | Tank et al. | .................. 356/455 |
| 5,341,207 | A | * | 8/1994 | Tank et al. | .................. 356/455 |
| 5,349,438 | A | * | 9/1994 | Solomon | ..................... 356/455 |

(Continued)

FOREIGN PATENT DOCUMENTS

WO   WO 03/078946 A1   9/2003

(Continued)

*Primary Examiner*—Gregory J Toatley, Jr.
*Assistant Examiner*—Scott M Richey
(74) *Attorney, Agent, or Firm*—Buchanan Ingersoll & Rooney PC

(57) ABSTRACT

The present invention relates to an interferometer, comprising at least a beamsplitter (10), at least one end reflector (11) for returning beams (S2, S3), and a set of reflectors (14, 15) for reflecting the beams (S2, S3) between the beamsplitter (10) and the end reflector (11) or the end reflectors, at least some of said set of reflectors (14, 15) being adapted to be rotatable around an axis (ω). Said set of reflectors comprises two angle reflectors (14, 15), constituted by plane reflectors, and the said end reflector (11) is or the end reflectors are an angle reflector constituted by plane reflectors (11', 11"). An angle line of the end reflector (11) is or the angle lines of end reflectors are arranged perpendicular to an angle line of both of the angle reflectors (14, 15).

13 Claims, 13 Drawing Sheets

U.S. PATENT DOCUMENTS

Figure 1:
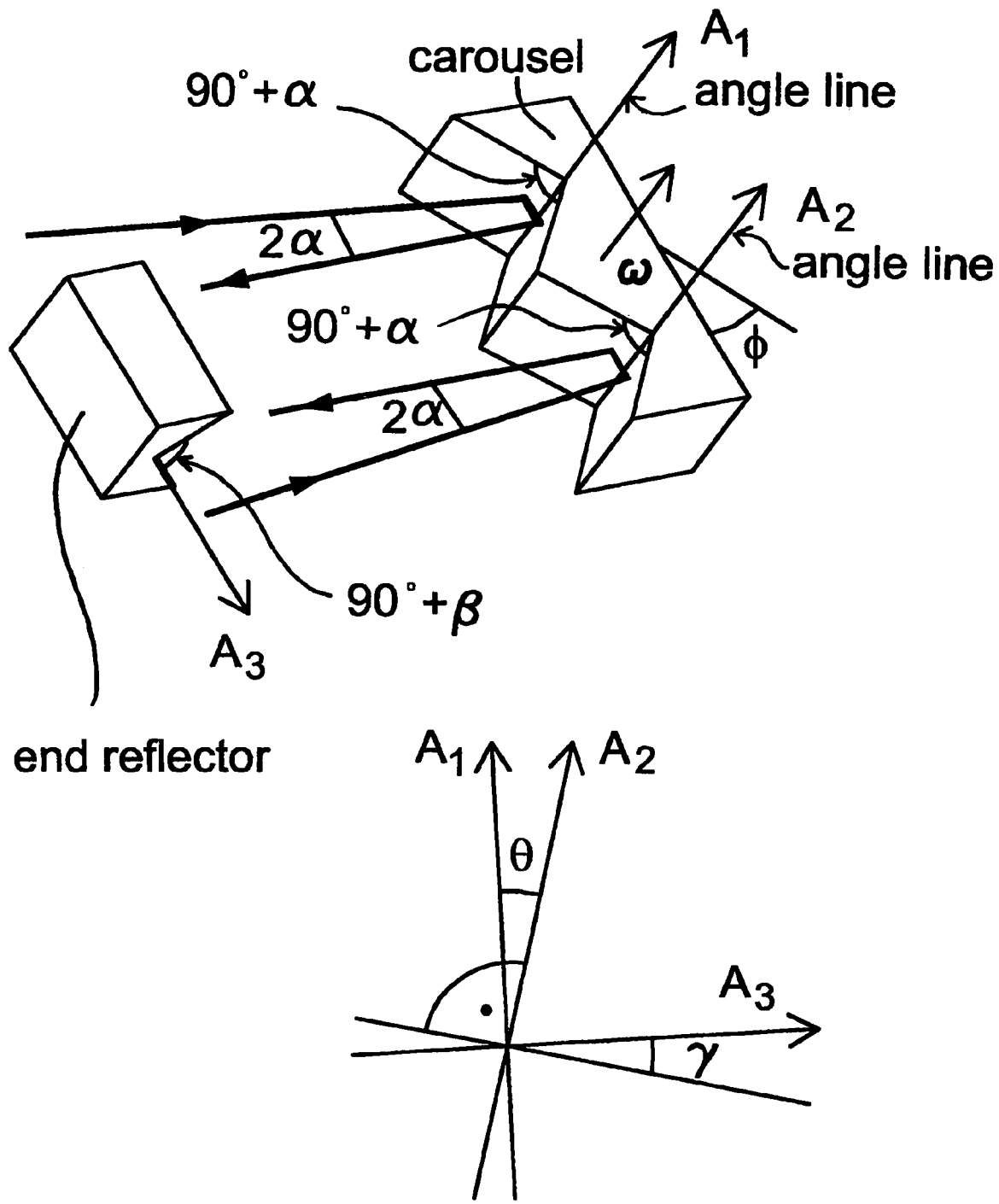

| | | | |
|---|---|---|---|
| 5,457,531 A * | 10/1995 | Rasanen | 356/455 |
| 6,075,598 A * | 6/2000 | Kauppinen | 356/450 |
| 6,469,790 B1 * | 10/2002 | Manning | 356/451 |
| 6,842,252 B1 * | 1/2005 | Gornall et al. | 356/455 |
| 7,280,217 B2 * | 10/2007 | Kauppinen | 356/455 |
| 2006/0146334 A1 * | 7/2006 | Cluff et al. | 356/455 |

FOREIGN PATENT DOCUMENTS

WO     WO 03078946 A1 *   9/2003

* cited by examiner

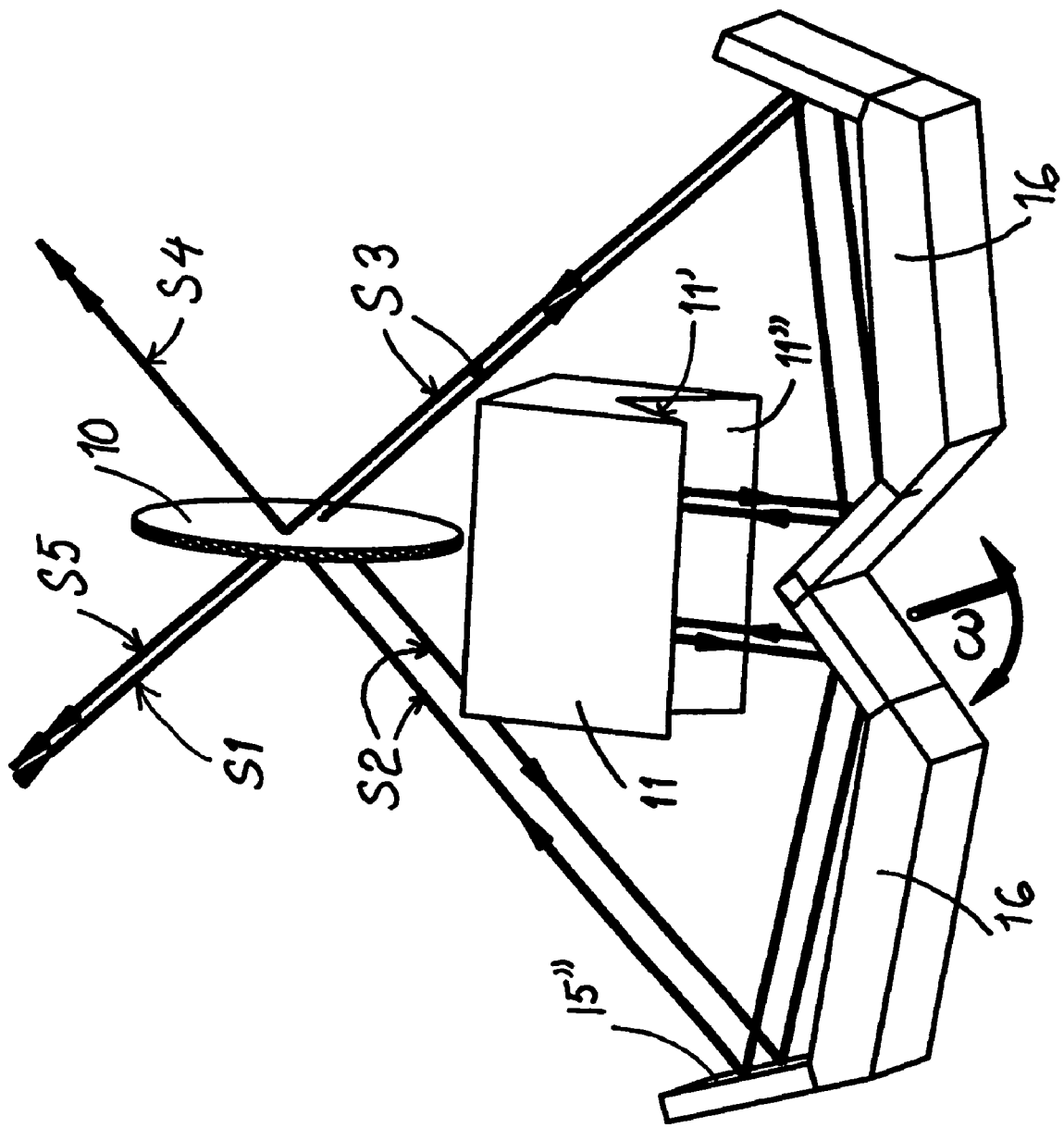
Fig. 3.b

INTERFEROMETER

FIELD OF THE INVENTION

The invention relates to an interferometer, to a method in an interferometer, and to an analyzer, such as a gas analyzer, as set forth in the preambles of the appended independent claims.

DESCRIPTION OF RELATED ART

Many different interferometers are available. The simplest interferometer is a Michelson plane mirror interferometer, whose main components are a beamsplitter, a fixed mirror, and a movable mirror. A light beam hits the beamsplitter, whereupon part of the light beam passes through, reflects from the fixed mirror back to the beamsplitter and therefrom to a receiver, which can be, for example, a photocell or a human eye. Part of the light beam reflects from the beamsplitter to the movable mirror, from which it reflects back to the beamsplitter and further to the receiver. The beams incident on the receiver from the fixed and movable mirror interfere. If the distance from both mirrors to the beamsplitter is exactly equal, said distances include the same number of wavelengths of the applied light. If the movable mirror is moved closer to or further away from the beamsplitter, the receiver can register interference maxima the distance of which is half of the wavelength.

An interferometer is used e.g. for determining distances at a very high accuracy, for mapping roughnesses in various surfaces, as well as for determining a wavelength or wavelengths (spectra) in electromagnetic radiation.

The widest application range for interferometers is spectrometry. An important feature in spectrometric applications is the capability of moving a movable mirror at high precision without tilting the mirror. High precision motion has been pursued by developing so-called carousel interferometers, wherein the changing of optical path differences is performed in such a way that a carousel, constituted by pairs of mirrors mounted on a stationary structure, is rotated back and forth around an axis. Hence, this increases the optical path for one beam and decreases it for the other.

For example, patent publication U.S. Pat. No. 5,159,405 discloses an interferometer comprising a stationary beamsplitter, a rotatable pair of mirrors constituted by two plane mirrors, as well as a pair of mirrors constituted by two plane mirrors set at an angle relative to each other and returning the beams. A problem in the cited solution is its instability. Although the cited solution represents an implement with respect to prior art interferometers, such an instrument still has some drawbacks. The principal reason for the inaccuracy of an interferometer as disclosed in the publication U.S. Pat. No. 5,159,405 is a long distance between the beamsplitter and the pair of mirrors returning the beams. Thus, when the base plate of an interferometer is subjected to deformation due to pressure and temperature variations, such that one edge thereof expands or contracts more than the other edge, or when the plate is subjected to torsional forces bending the opposite corners of the plate in different directions, the resulting measurement disturbances will be significant.

Patent publication U.S. Pat. No. 5,309,217 discloses a Fourier spectrometer comprising a beamsplitter, a rotatable pair of mirrors constituted by two cube-corner mirrors, as well as two fixed returning mirrors. The cited solution provides a compact configuration. However, a problem in the solution is the use of a cube-corner mirror consisting of three mirrors. In order to render the solution stable and fully functional in all circumstances, the angles between all mirrors included in cube-corner mirrors should be precisely 90°. If the angles deviate slightly from 90°, there will be six images, and a plane wave in the interferometer will be divided into six unequal-phase zones. The manufacture of a cube-corner mirror with all of its angles being precisely 90° is highly expensive, so the manufacturing costs for an instrument as disclosed in the cited publication are extremely high.

The earlier patent publication U.S. Pat. No. 6,075,598 of the applicant discloses a further developed carousel interferometer, wherein a beam reflected from a radiation source is divided by a beamsplitter into two individual beams. In addition, the interferometer described in U.S. Pat. No. 6,075,598 comprises one plane mirror for returning the beams, as well as two pairs of mirrors for reflecting the beamsplitter-emitted beams to said returning plane mirror and the beams returning therefrom further back to the beamsplitter. Said pairs of mirrors guiding the beams between the beamsplitter and the returning plane mirror are mounted on a rigid structure, a carousel, which is adapted to be rotatable around an axis. The solution disclosed in the publication U.S. Pat. No. 6,075,598 provides a highly stable structure, wherein the passage of beams cannot be affected by potential base plate deformations.

It has now been discovered that the solution disclosed in the publication U.S. Pat. No. 6,075,598 can be improved even further. In the solution set forth in U.S. Pat. No. 6,075,598 the mounting of a carousel to effect its rotation in an exactly horizontal position is difficult in some applications. In other words, it has been discovered that, in certain conditions, the rotation axis of a carousel has a tendency towards a slight tilt deviating from a precise vertical plane. If the axis and a carousel mounted thereon become tilted in the direction of a plane of a beamsplitter, the beams will be deflected, such that the end mirror will be hit by the latter either higher or lower and so will the beamsplitter by returning beams. In this case, the deflection of both beams occurs in the same direction, with no disturbance in the operation of the interferometer. However, if the axis and a carousel mounted thereon become tilted in a direction deviating from that of a plane of a beamsplitter, the deflections of beams occur in deviating directions and the operation of the interferometer may be disturbed.

Another present discovery is that one problem in the solution disclosed in U.S. Pat. No. 6,075,598 is its adjustment, which is performed by adjusting the beamsplitter. It has now become evident that the adjustment of a beamsplitter, i.e. the precise setting of its attitude and position, is practically difficult in some cases. One reason for the difficulty is e.g. that the beamsplitter is manufactured in such a soft material that it may deform or yield in the process of performing an adjustment with set screws.

Furthermore, an additional drawback of known interferometers is the need of quality mirrors. Lack of flatness in one or more mirrors reduces the accuracy of an interferometer. Use of quality mirrors increases manufacturing costs of an interferometer.

Additionally, in some applications problems occur when the light comes out from the same point of the interferometer than from which it was delivered. In this case the light reflected back from the outside of the interferometer might travel the second time through the interferometer and finally reach the detector. This double modulation disturbs the interference signal.

SUMMARY

Hence, it is an object of an interferometer according to one embodiment of the present invention to eliminate or at least reduce problems caused by the above-stated prior art.

Another object of an interferometer according to one embodiment of the present invention is to provide an accurate and highly stable interferometer, wherein the effect of potential trouble sources on measuring accuracy is eliminated or at least undermined.

According to one embodiment of the invention, a still further object is to provide an interferometer, which has plain and simple construction. The plain and simple construction reduces manufacturing cost and maintenance expenses.

Still another object of an interferometer according to one embodiment of the present invention is to provide a compact interferometer, which is capable of achieving a considerable change in an optical path difference with respect to external interferometer dimensions.

In order to achieve e.g. the above objectives, an interferometer, a method in a interferometer, and an analyzer of the invention is principally characterized by what is set forth in the characterizing parts of the appended independent claims.

In a typical interferometer according to one embodiment of the present invention, an interferometer, comprises at least a beamsplitter, at least one end reflector for returning beams, and a set of reflectors for reflecting the beams between the beamsplitter and the end reflector or the end reflectors, at least some of said set of reflectors being adapted to be rotatable around an axis. Typically said set of reflectors comprises two angle reflectors, constituted by plane reflectors, and the said end reflector is or the end reflectors are an angle reflector constituted by plane reflectors. Furthermore, it is typical that an angle line of the end reflector is or angle lines of end reflectors are arranged perpendicular to an angle line of both of the angle reflectors. When an angle line of the end reflector is or the angle lines of end reflectors are arranged perpendicular to an angle line of both of the angle reflectors, angle between said angle lines is substantially 90 degrees. In some embodiments with smaller precision requirement, it is possible that the angle slightly differs from 90 degrees e.g. due to limited accuracy of manufacture of the interferometer.

One benefit gained by an interferometer according to one embodiment of the present invention is that the decrease of the modulation of the interferometer due to an imperfect optics is proportional to the square of the product of four angles (in radians). These angles are the rotation angle of the carousel, the angle between the beams going to and reflecting from the rotating reflector, the angle between the angle lines of the rotating reflectors, and the deviation angle, which tells how much the angle between the angle lines of the end reflector and the rotating reflector deviates from 90 degrees. Because all these angles are smaller than one, the product of those angles is always smaller than any of those angles. For example, in the Carousel interferometer in U.S. Pat. No. 6,075,598 the modulation decrease is orders of magnitudes larger, because the decrease of the modulation is proportional to the square of the product of the first three angles mentioned above, and it is larger than the square of the product of all four angles in the present invention, where fourth angle is much smaller than one.

In an embodiment of the invention the angle reflectors are constituted by two plane reflectors, between which is provided an angle typically of about 72-107 degrees, preferably of about 85-95 degrees, and most preferably of 90 degrees. Advantageously, the plane reflectors constituting an angle reflector are linked to each other for example by means of a common support structure or frame.

In one embodiment of the present invention, the end reflector is or the end reflectors are arranged to be adjustable in relation to the beam splitter. In this way it is possible to adjust the fourth angle to the smallest possible value.

In one another embodiment of the present invention, the beamsplitter and the end reflector or the end reflectors are mounted on a first rigid structure, and that the angle reflectors are mounted on the second rigid structure which is adapted to be rotatable around an axis. It is also possible that the second rigid structure is mounted rotatably on the first rigid structure. This provides particularly good interferometer stability, since potential distortions in the base of an interferometer do not affect the passage of beams.

In one embodiment of the invention said set of reflectors further comprises at least one pair of plane reflectors. Preferably the pair of plane reflectors has its plane reflectors arranged in such a way that the beams, coming from the beamsplitter to the pair of plane reflectors, travel by way of the angle reflectors and hit the end reflector perpendicularly to its angle line, the beams reflected from the end reflector returning over the same direction but laterally shifted back to the beamsplitter. In some experiments or situations it is important to prevent the backreflection or the double modulation. This arrangement does it, because the possible back reflected light goes back to the radiation source not to the detector.

According to one embodiment of the invention, the interferometer is arranged in such a way that a beam to be delivered to the interferometer is conductible to the beamsplitter, the beamsplitter being arranged to divide the beam into two beams, namely the first beam and the second beam, the first beam is arranged to be reflected from the beamsplitter to the first angle reflector and further towards the end reflector, and to return from the end reflector over the same direction but laterally shifted back to the beamsplitter, the second beam is arranged to pass through the beamsplitter and to advance to the second angle reflector and further towards the end reflector, and to return over the same direction but laterally shifted back to the beamsplitter, and that the beamsplitter is arranged to combine the first and second beams returning from the end reflector for a single beam.

According to one another embodiment of the invention, the interferometer is arranged in such a way that a beam to be delivered to the interferometer is conductible to the beamsplitter, the beamsplitter being arranged to divide the beam into two beams, namely the first beam and the second beam, the first beam is arranged to be reflected from the beamsplitter to the first plane reflector, from the first plane reflector to the first angle reflector, from the first angle reflector towards the end reflector, and to return from the end reflector over the same direction but laterally shifted back to the beamsplitter, the second beam is arranged to pass through the beamsplitter and to advance to the second plane reflector and to reflect from the second plane reflector to the second angle reflector, from the second angle reflector towards the end reflector, and to return from the end reflector over the same direction but laterally shifted back to the beamsplitter, the beamsplitter is arranged to combine the first and second beams returning from the end reflector for a single beam.

According to one another embodiment of the invention, the interferometer is arranged in such a way that the first and the second beam has its own end reflector the angle between the angle lines of the end reflectors is preferably about 80-100 degrees, and most preferably about 89-91 degrees.

According to one embodiment of the present invention, at least some of the reflectors are produced by replication. By replication we mean a process of manufacturing optics by transferring the optical surface of a master (or mold) to one or more copies of the surface. The copies, which approximate the final surface before replication, then take on the precise characteristics of the master surface. Different forms of replication include e.g. thin film epoxy replication, plastic molding, nickel electro-formed optics and plastic casting. Advantage of the replication is its economic efficiency when compared to use of high quality mirrors with expensive setting costs.

In one embodiment of the present invention, the said two angle reflectors are formed by arranging into a one solid body four plane surface such that the first two of said plane surfaces are perpendicular to each other and the third and fourth of said plane surfaces are perpendicular to each other, and that a reflecting surface is produced to said plane surfaces by replication.

According to the typical method according to one embodiment of the present invention, optical beams are guided using at least two angle reflectors, constituted by plane reflectors, and at least one end reflector constituted by plane reflectors, and wherein an angle line of the end reflector is or end reflectors are arranged perpendicular to an angle line of both of the angle reflectors.

BRIEF DESCRIPTION OF THE DRAWING FIGURES

Figure 2A:
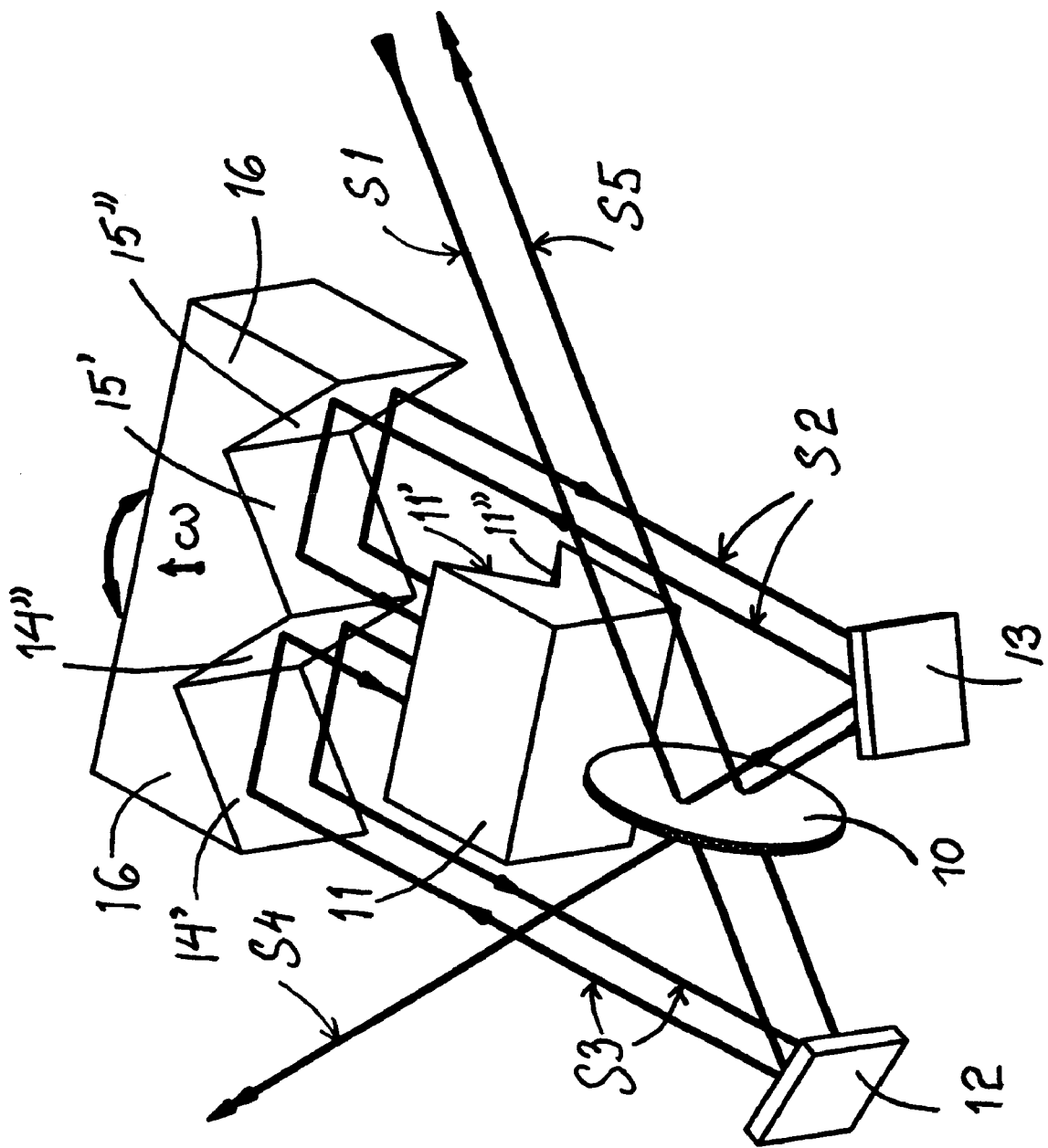
Figure 2B:
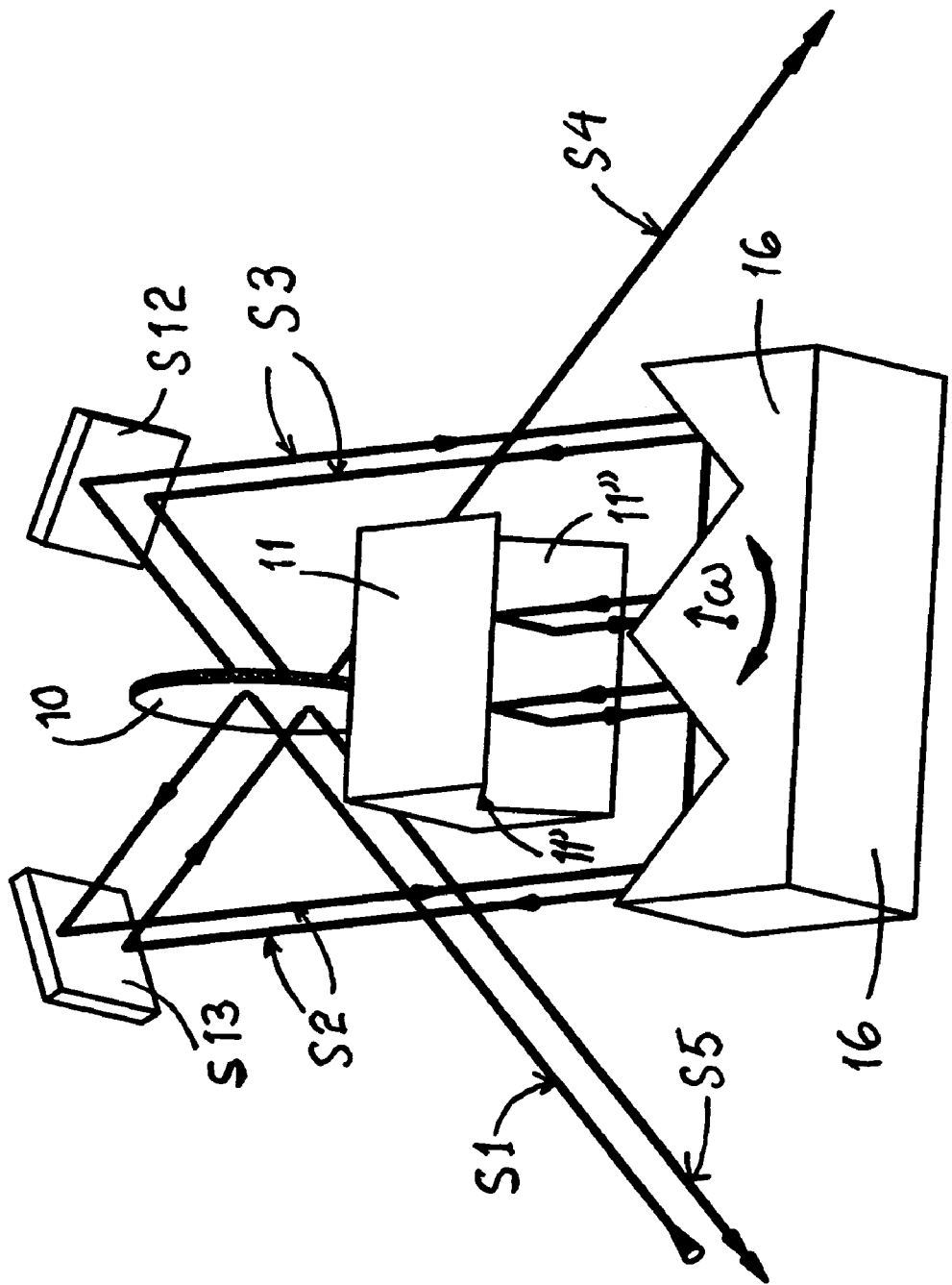
Figure 2C:
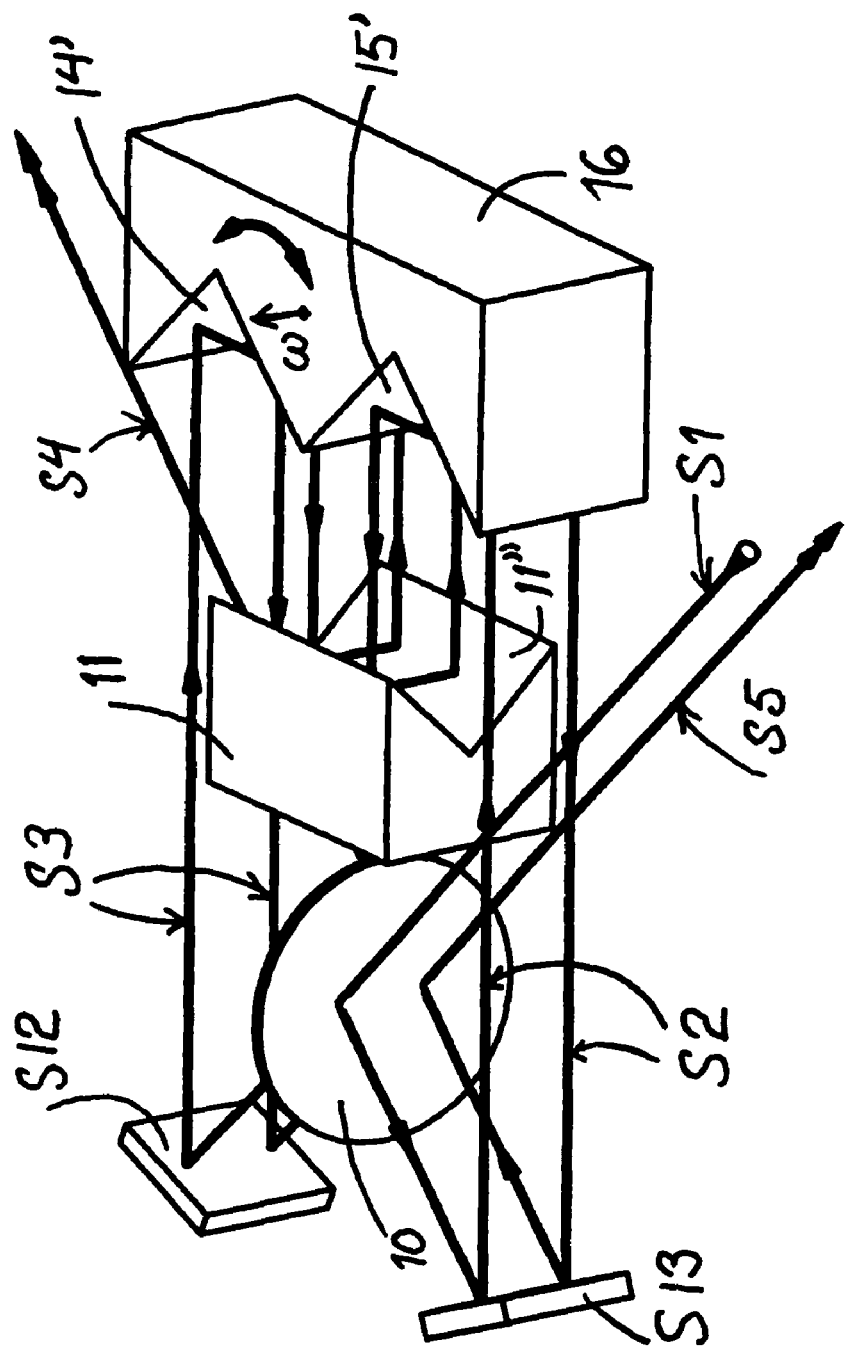
Figure 3A:
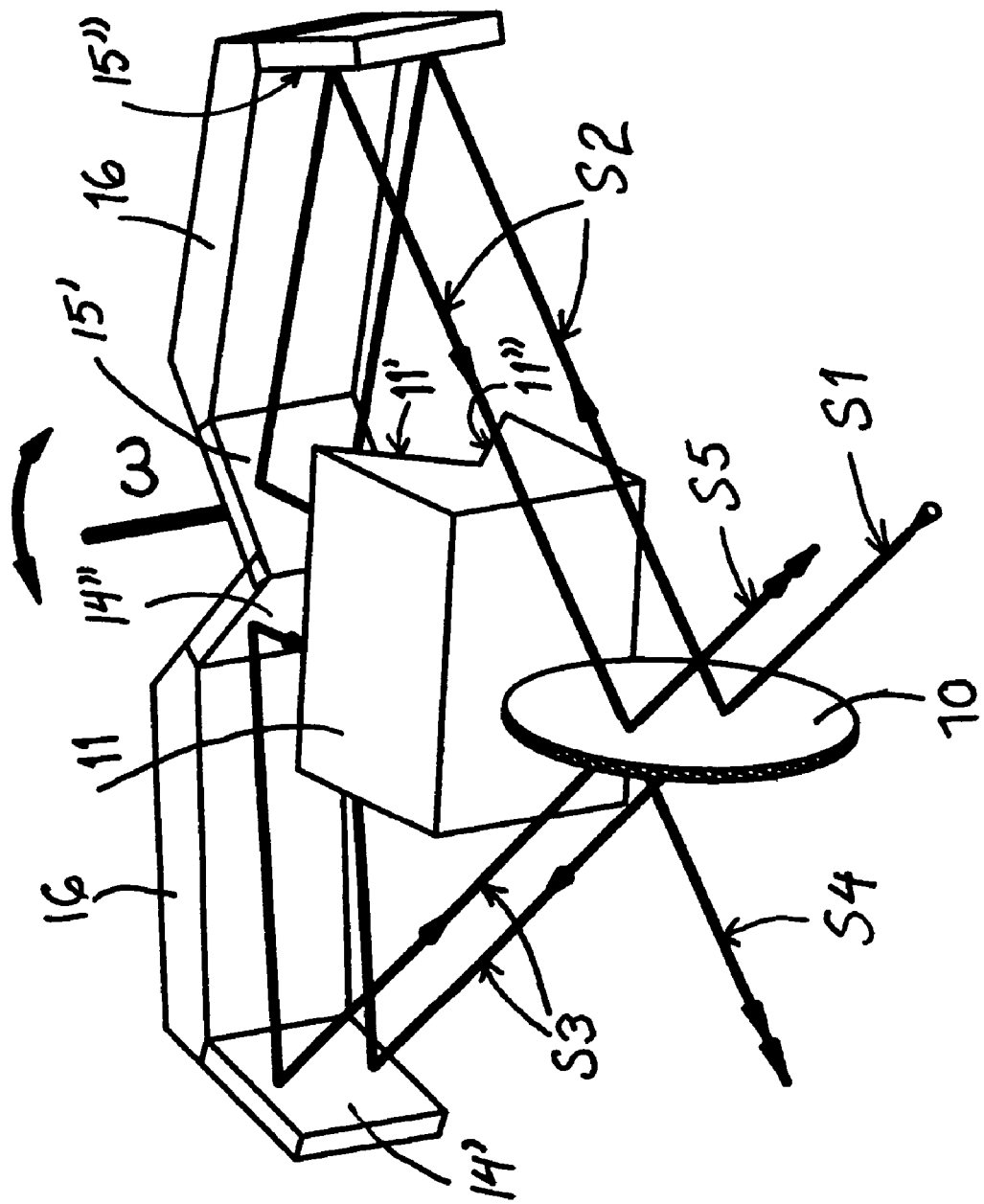
Figure 3C:
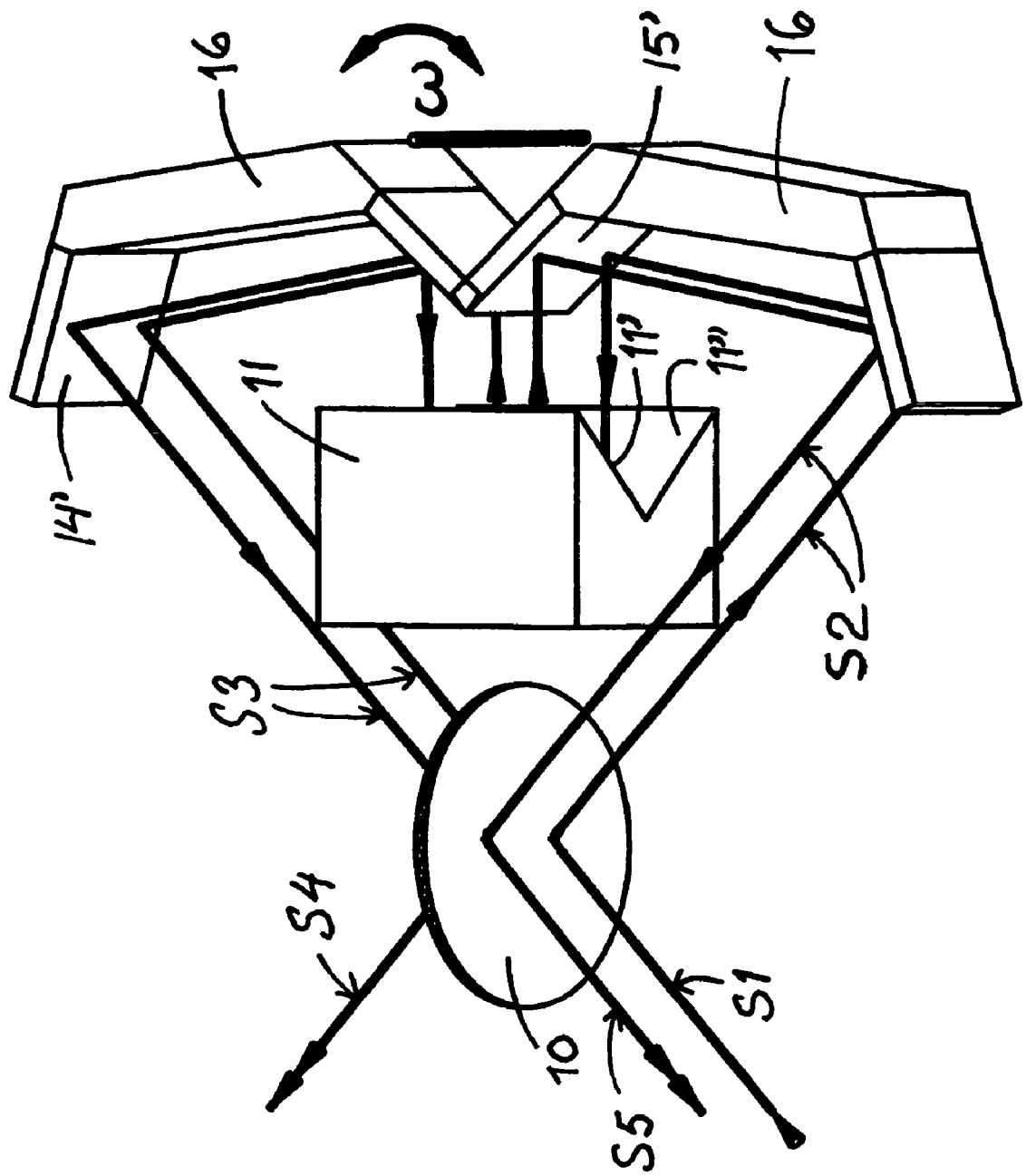
Figure 4A:
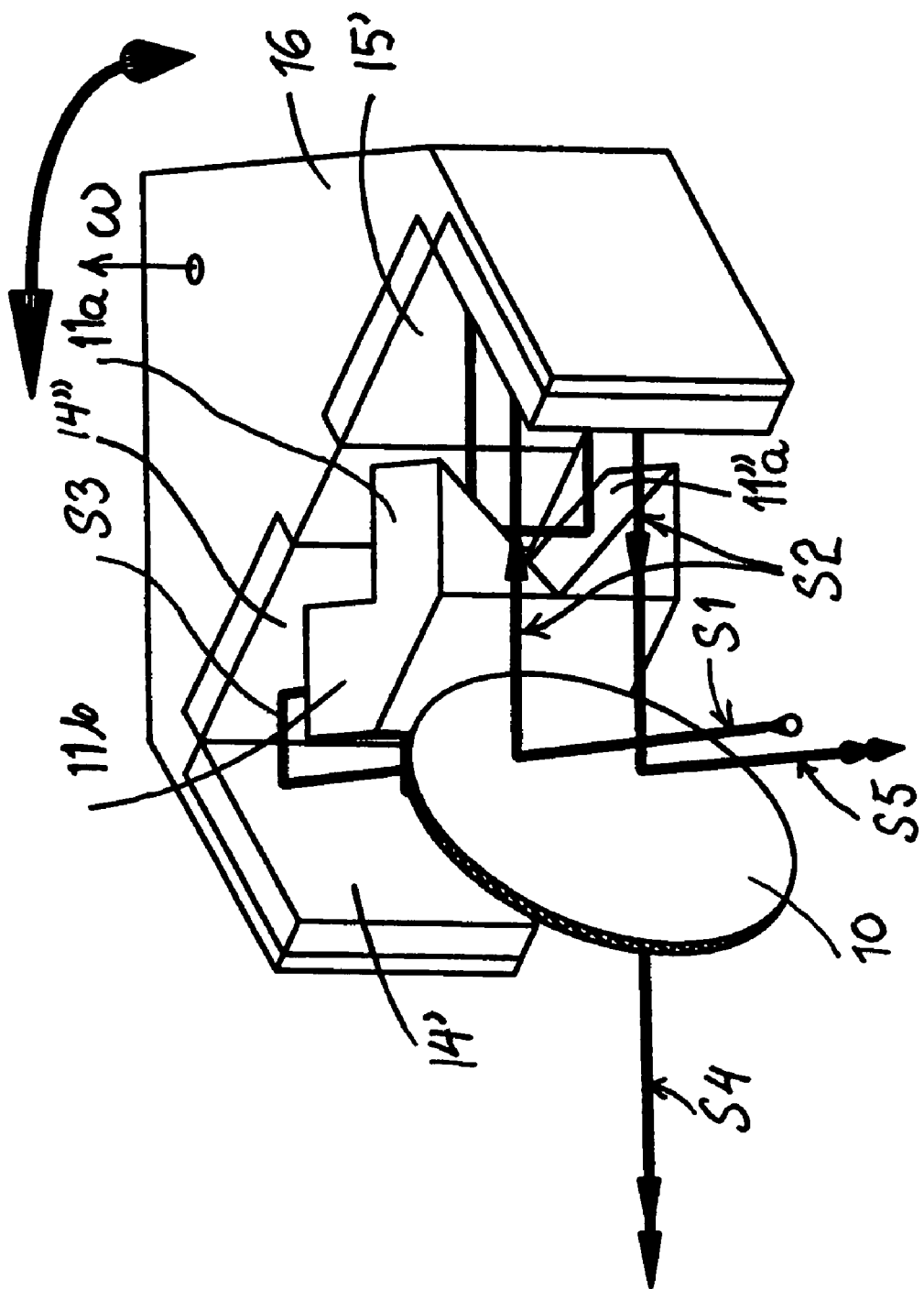
Figure 4B:
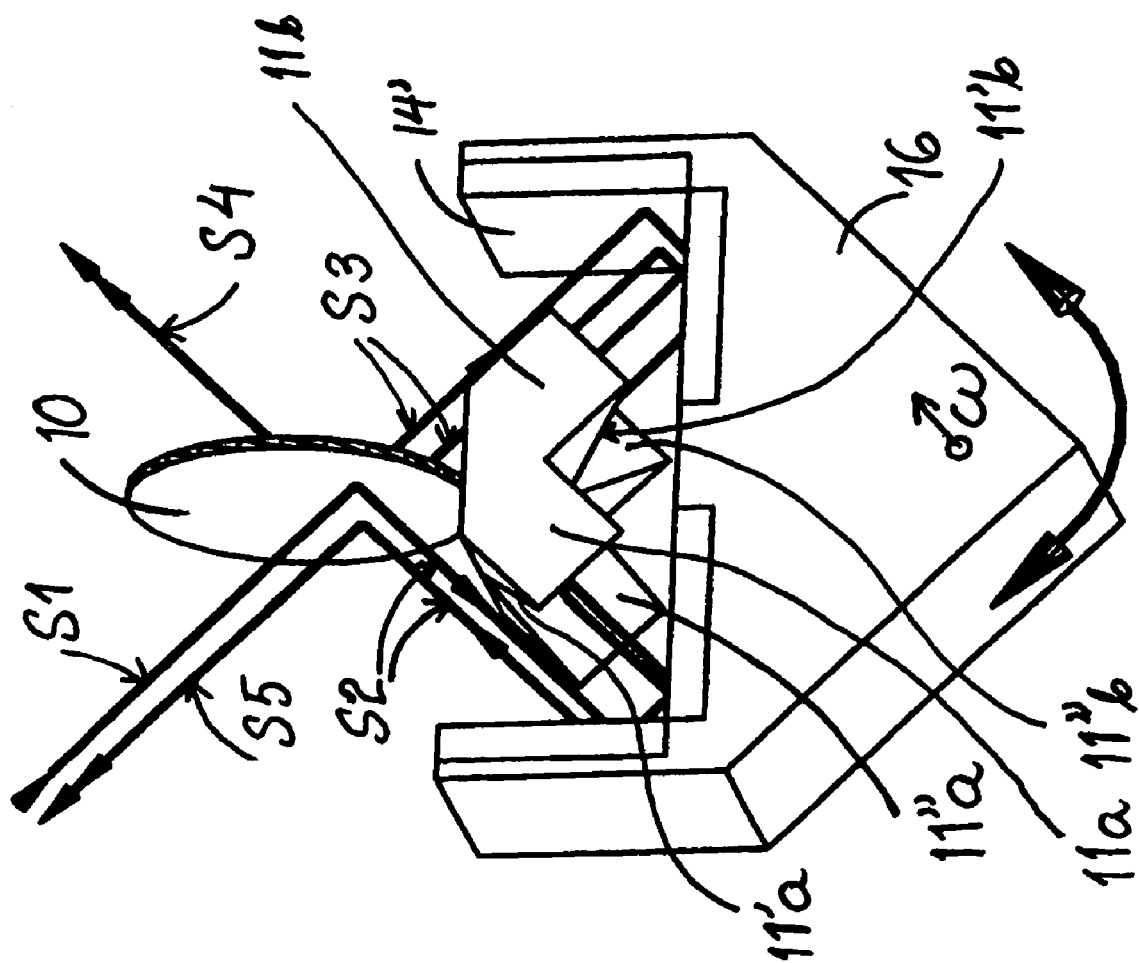
Figure 4C:
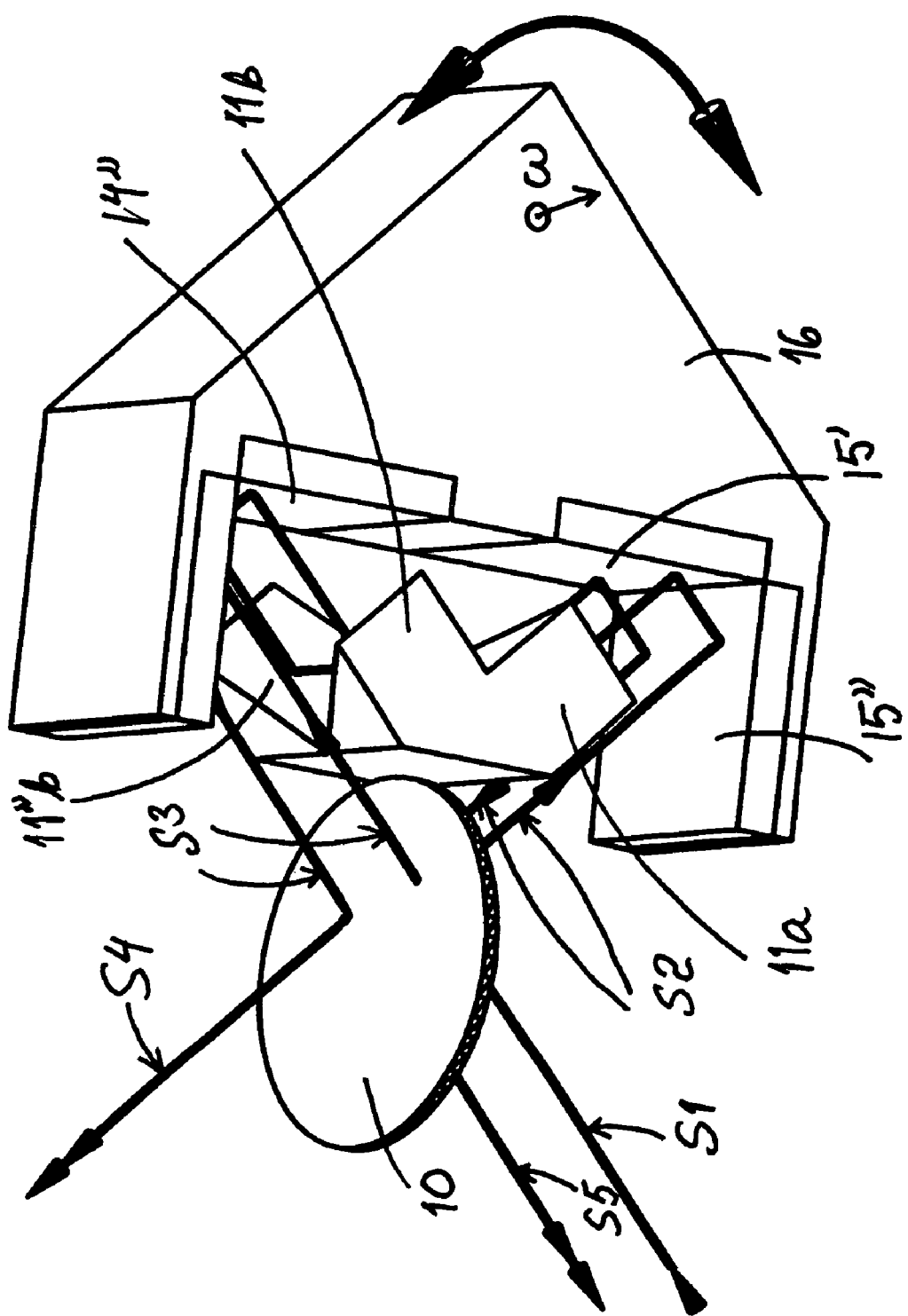
Figure 5A:
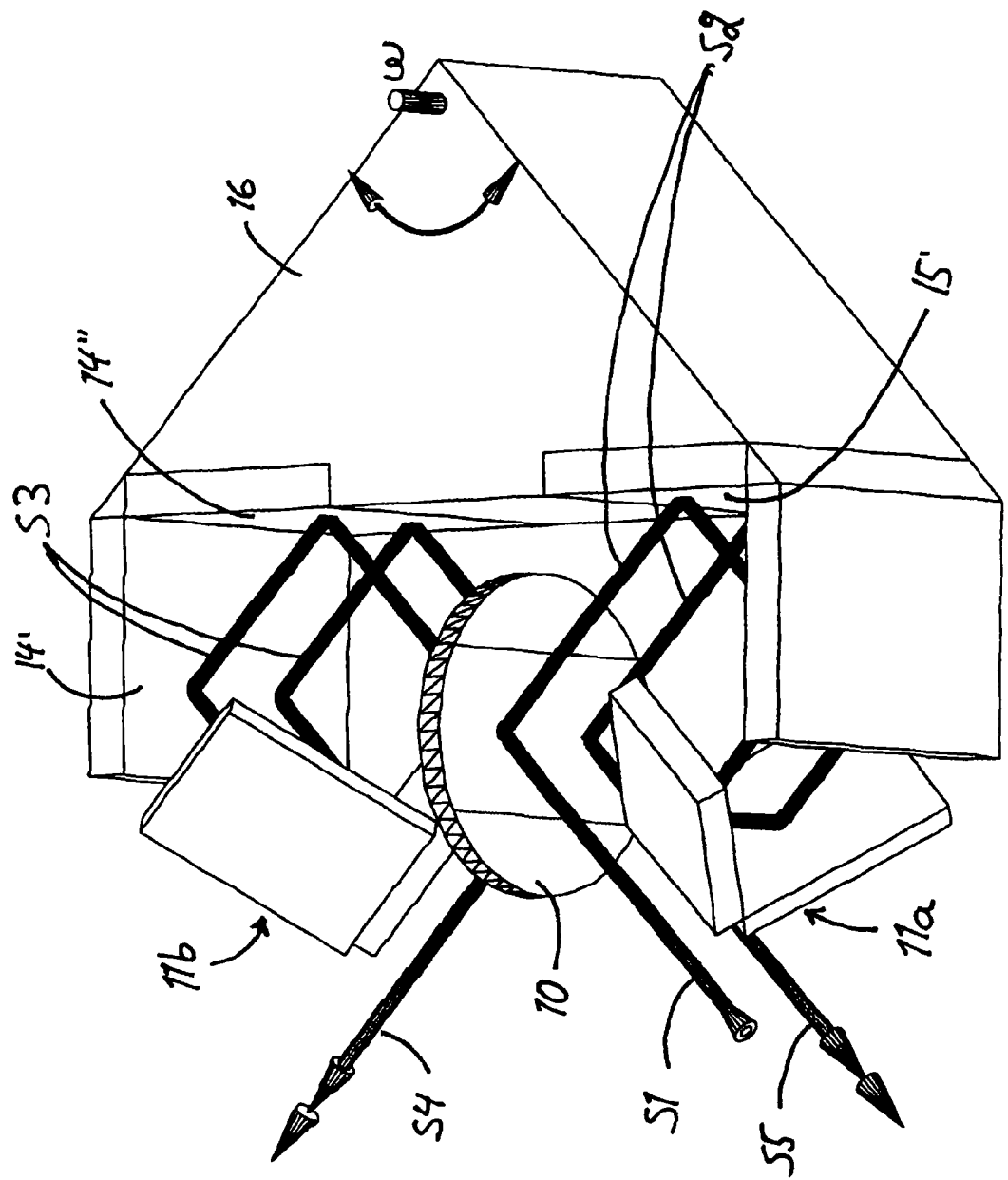
Figure 5B:
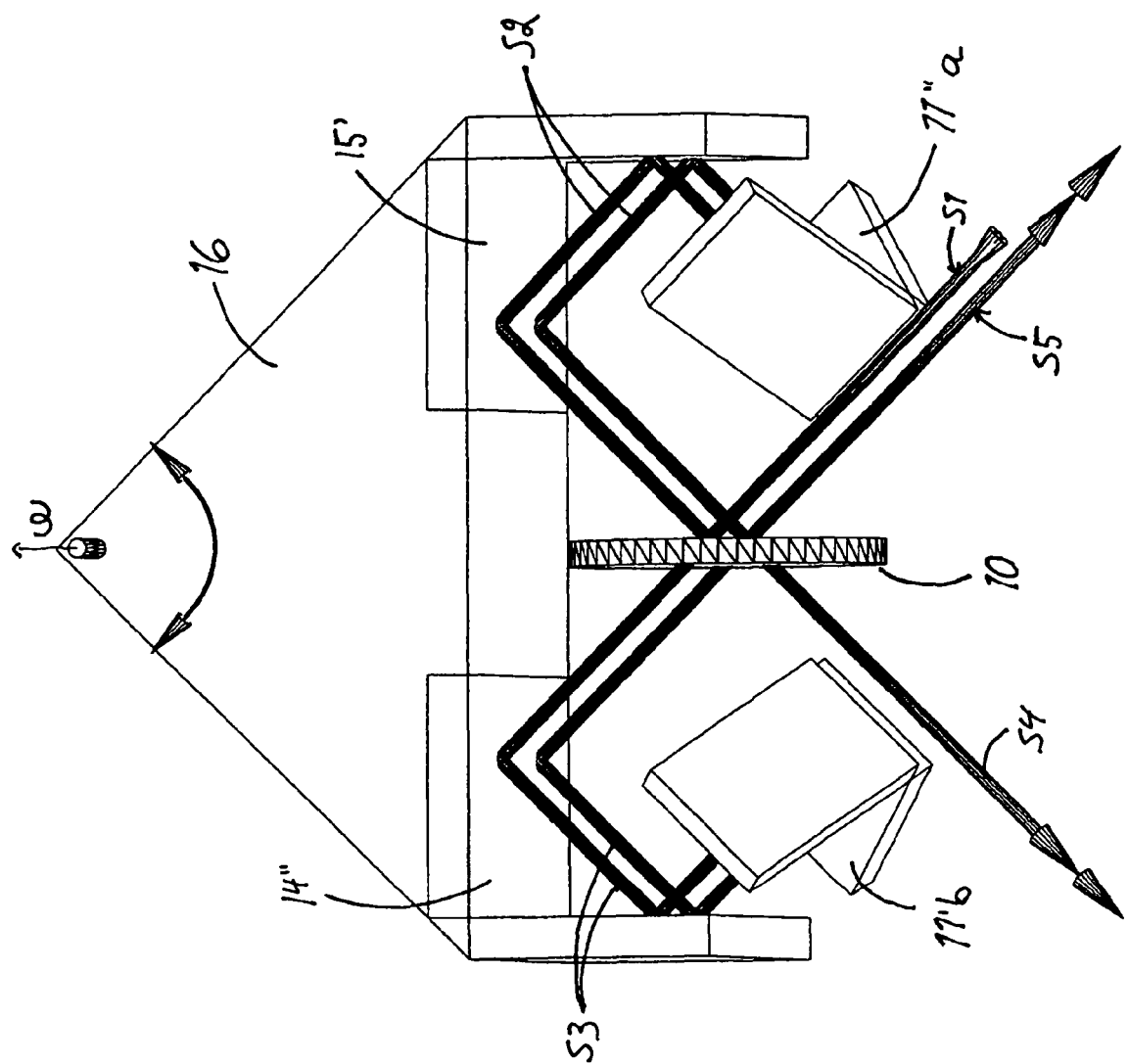
Figure 5C:
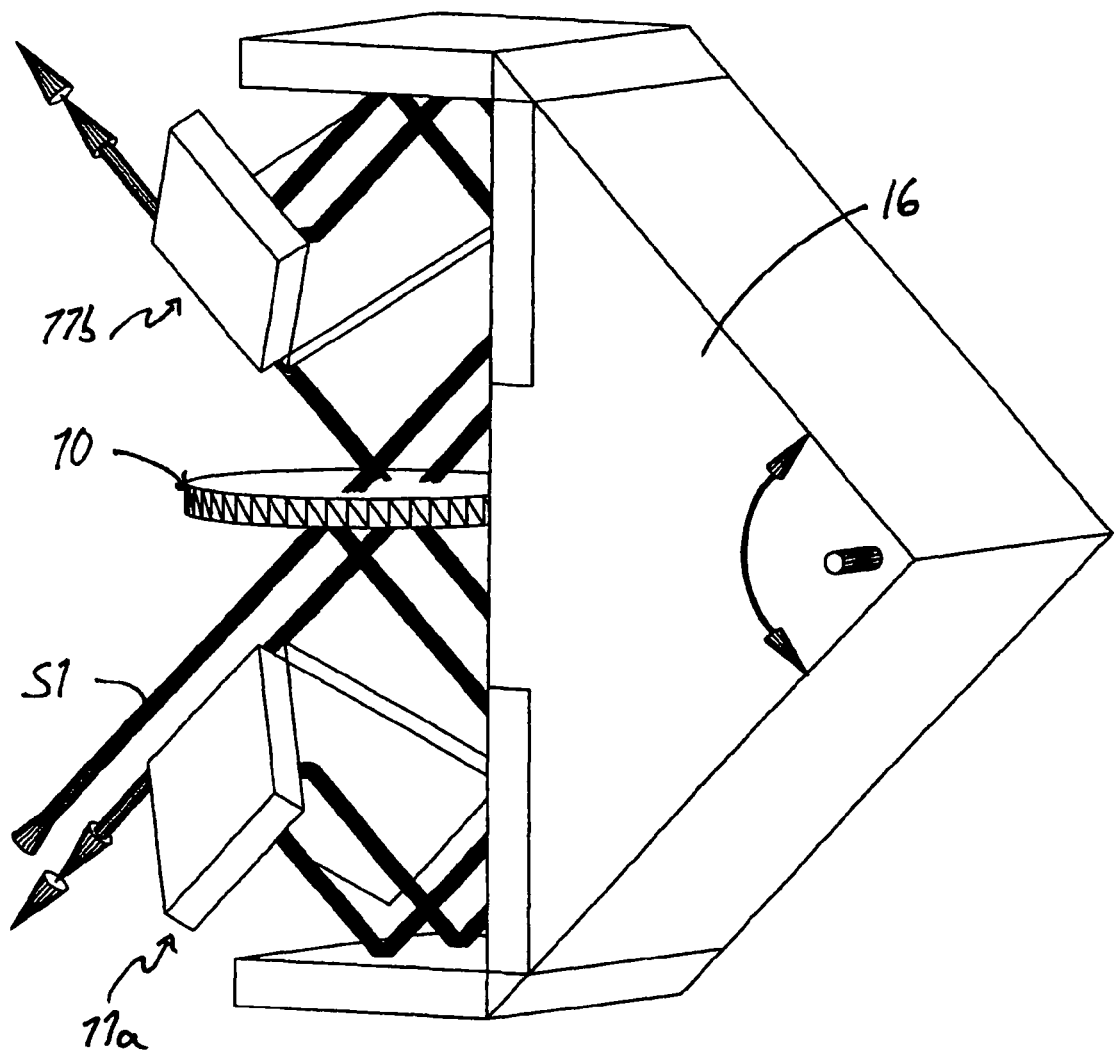

The invention will now be described in more detail with reference to the accompanying drawing, in which FIG. 1 shows schematically angles and angle lines of the reflectors used to describe the performance of the interferometer of the invention, FIG. 2a-2c shows schematically an interferometer according to one embodiment of the invention from the different visual angle, FIG. 3a-3c shows schematically an interferometer according to an another embodiment of the invention from the different visual angle, FIG. 4a-4c shows schematically an interferometer according to a third embodiment of the invention from the different visual angle, and FIG. 5a-5c shows schematically an interferometer according to a fourth embodiment of the invention from the different visual angle.

DETAILED DESCRIPTION OF THE PREFERRED EMBODIMENTS

FIG. 1 illustrates angles and angle lines $A_1$, $A_2$, and $A_3$ of an interferometer according to one embodiment of the present invention. In the interferometer the signal to be measured is proportional to the modulation of the interferometer. In the interferometer of the present invention the modulation m is given by $$m=1-(\pi\Omega D/\lambda)^2/8, \quad (1)$$

where $\lambda$ is the wavelength of the light to be measured, D is the diameter of the light beam going through the interferometer, and $\Omega$ is the deviation angle between the first (S2) and the second (S3) beam on the beamsplitter.

The deviation angle in the interferometer of the present invention is given by $$\Omega=\theta\varphi\gamma \sin 2\alpha = 2\theta\varphi\gamma\alpha, \quad (2)$$

where the all the angles are shown in FIG. 1 and they are smaller than one.

The deviation angle of the interferometer according to the present invention can be compared to deviation angles of typical prior art interferometers. For example a deviation angle for the interferometer comprising cube-corner mirrors and disclosed in the patent publication U.S. Pat. No. 5,309,217 ('217) is given by $$\Omega \approx 8\varphi, \quad (3)$$

where $\varphi$ is the average angle how much the angles between the mirrors deviate from 90 degrees in the cube corners. A deviation angle in an interferometer disclosed in the patent publication U.S. Pat. No. 6,075,598 ('598) is given by $$\Omega=2\theta\varphi\alpha. \quad (4)$$

A rough comparison between the mentioned interferometers and the present invention can be done as follows: If all the interferometers mentioned above have modulation m=0.9 (Eq. 1) with D=25 mm, $\lambda$=2.5 µm, R=5 cm, and $\varphi$=¼0, then $\varphi$ is about one arc second ($5\cdot10^{-6}$) for '217, which are very expensive with this angle accuracy, $\theta$ is about 45 arc seconds for '598, and $\theta$ and $\gamma$ are about 2000 arc seconds for the interferometer according to the present invention. This means that the tolerances in the interferometer of the present invention are very large, which makes manufacturing simpler and cheaper and makes it possible to apply the replication method to make the mirrors. If the angle accuracy is better than 2000 arc seconds, then the modulation of the interferometer of the present invention is better than 0.9.

FIGS. 2a-2c illustrates one embodiment for an interferometer of the present invention. As depicted in the figure, the interferometer comprises a beamsplitter 10 for dividing a beam S1, emitted for example from a radiation source (not shown in the figure), into two individual beams, i.e. a first beam S2, which has reflected from the beamsplitter, and a second beam S3, which has progressed through the beamsplitter. In addition, the interferometer comprises an end reflector 11, constituted by two plane reflectors 11' and 11", for returning the beams S2 and S3. The beams S2 and S3 are reflected between the beamsplitter 10 and the end reflector by a set of reflectors, comprising a pair of reflectors, constituted by two plane reflectors 12 and 13 for reflecting the beams S2 and S3, and two angle reflectors 14 and 15. The angle reflectors 14 and 15 are constituted by two plane reflectors 14' and 14" as well as 15' and 15", respectively, mounted at a substantially right or 90° angle relative to each other. The beams S2 and S3, returning from the end reflector 11 by way of the angle reflectors 14 and 15 and the plane reflectors 12 and 13, are reassembled by the beamsplitter 10 for a single beam S4 which is conducted e.g. to a detector (not shown in the figure). As depicted in the figure, the beam S1 is guided to the beamsplitter 10 through between the plane reflector 13 and the angle reflector 15. As shown in the figure, the reassembled beam S4 is directed from the beamsplitter 10 towards an interspace between the plane reflector 12 and the angle reflector 14, from which the beam S4 can be conducted further for example to a detector or in which interspace an appropriate detector can be accommodated.

The beamsplitter 10, the plane reflectors 12 and 13, as well as the end reflector 11 are mounted on a first rigid support structure (not shown for the beamsplitter in the figure). The angle reflectors 14 and 15 are mounted on a second rigid structure 16. The second rigid structure is adapted to be rotatable around a rotation axis ω, whereby an optical distance traveled by the beams S2 and S3 can be changed by varying a position or rotational angle of the second rigid structure around the axis. In this context, the rotation axis ω refers either to a physical element or its anticipated extension or to a conceivable line, about and/or around which the second rigid element is rotatable. The beamsplitter 10 may include a compensation panel or, if necessary, the interferometer can be provided with a separate compensation panel.

The angle reflector 14, constituted by the plane reflectors 14' and 14", deflects the course of the beam S3 substantially by 180°, i.e. the angle reflector 14 reverses the course of the beam S3, yet in a laterally offset position. Respectively, the angle reflector 15, constituted by the plane reflectors 15' and 15", deflects the course of the beam S2 substantially by 180°, i.e. the angle reflector 15 reverses the course of the beam S2, yet in a laterally offset position. This means that α≈0. The plane reflectors 12 and 13, directing the beams S2 and S3, are adjusted in such a way that the beams S2 and S3 hit the angle line of the end reflector 11 perpendicularly, i.e. such that the beams S2 and S3, reflecting from the plane reflectors 12 and 13 to the angle reflectors 14 and 15, are perpendicular to the angle line of the end reflector 11. The described setup and configuration of reflectors provides the advantage that a reversal of the beams S2 and S3 always retains the same direction, even if the rotation axis ω were to tilt off the exact vertical plane. Moreover, with the exception of strains caused by torsional forces, the above arrangement also tolerates practically all other deformations in the base of an interferometer. Thus, since, according to the present invention, the beams travel to and from movably mounted reflectors at an equal and substantially unchanging angle, the result will be an extremely stable structure.

An optical path difference x between the beams S2 and S3 is highly linear in an interferometer according to the invention. As stated above, the optical path difference x of the beams S2 and S3 changes as the angle reflectors mounted on the second rigid structure are rotated around the rotation axis ω. Hence, the optical path difference x changes as a function of a rotational angle ϕ, such that x=8Rϕ. Thus, the optical path difference between the beams changes quickly in proportion to a shift in the rotational angle of the movably mounted reflectors. Furthermore, in the inventive solution, a change of the optical path difference with an equal shift in the rotational angle exceeds that obtained for example in the interferometer disclosed in the patent publication U.S. Pat. No. 6,075,598. Thus, in an interferometer of the present invention, the fall of modulation is substantially less than for example in the interferometer disclosed in the patent publication U.S. Pat. No. 6,075,598, in which the angle 2α is typically more than 30 degrees. Using Eqs. 2 and 4 the ratio of the fall of the modulations in a interferometer disclosed in the patent publication U.S. Pat. No. 6,075,598 and the interferometer of the present invention is $(\Delta\alpha\gamma/2\alpha)^2$, where $\Delta\alpha$ is the angle between the beams going to and reflected from the rotating angle reflectors. If $\Delta\alpha$ and $\gamma$ are both for example one degree, then the ratio is about $3.4\cdot10^{-7}$.

Thus, the stability of the interferometer according to the invention is the better the closer the angle between a beam going to and a beam reflected from the angle reflector is to zero. However, for reasons relating to manufacturing techniques, it is not always possible to attain an absolutely perfect 180-degree angle. Moreover, there are applications that do not necessitate such a high stability, whereby the inventive interferometer can also be manufactured, for example in view of reducing the size of an interferometer, in such a way that there is an angle of 145°-215° between a beam going to and a beam reflected from the angle reflectors. In this case, the angle between plane reflectors constituting the angle reflector is about 72-107 degrees. In some applications for an interferometer of the invention, the angle between plane reflectors is 80-100 degrees, while in other applications it could be 85-95 degrees. The size of an angle between plane reflectors depends e.g. on stability required in a particular application and the size and shape requirements of a particular interferometer.

As for the plane reflectors 12 and 13, at least one is made adjustable. Thus, the angle reflectors 14 and 15 used in an interferometer can be fabricated in a substantially right angle design even prior to assembling the interferometer. After the interferometer has been assembled, it is sufficient that the orientation of an adjustable plane reflector be such that the direction of a beam reflected thereby is perpendicular to the angle line of the end reflector 11. The interferometer is preferably provided with adjusters (not shown in the figures) for changing the attitude of an adjustable plane reflector/reflectors. The adjustment of an interferometer can also be effected by providing the interferometer with adjusters for controlling the attitude of a beamsplitter. If an interferometer is provided with means for controlling the attitude of a beamsplitter, the plane reflectors 12 and/or 13 need not necessarily be made adjustable.

Hence, varying the optical path difference x is performed by turning and/or rotating a carousel constituted by the angle reflectors 14 and 15 around the axis ωA. Thus, the optical path for the first beam S2 increases and the optical path for the second beam S3 decreases or vice versa, respectively. Since the plane reflectors, which constitute an angle reflector, remain fixedly and precisely at a right angle relative to each other, it is always by the same 180° that the angle reflector reverses the course of a beam incident thereon. That way, the beams always arrive substantially perpendicular to the angle line of the end reflector 11 and always reflect back to return on the same path. In addition, since the only components rotated in an interferometer of the present invention are angle reflectors, the beams do not practically shift at all on any reflector in the interferometer. By virtue of this, the inventive interferometer has its resolution improved even further.

FIGS. 3a-3c illustrate schematically a second embodiment for the optical layout of an interferometer of the present invention. The numbering of FIGS. 2a-2c is applied in the FIGS. 3a-3c as appropriate. In the illustrated embodiment, the optical layout of the interferometer has been modified with respect to FIGS. 2a-2c, such that the angle 2α is about 45 degrees that makes possible to take out the reflectors 12 and 13 shown in FIG. 2. The major difference compared to the interferometer disclosed in the patent publication U.S. Pat. No. 6,075,598 is that the end reflector is an angle reflector improving the modulation and preventing the backreflection. Also due to the significantly higher tolerances in the interferometer of the present invention all the mirrors can be made by using replication technique and this way reduce the manufacturing costs.

FIGS. 4a-4c illustrate a third embodiment for the optical layout of an interferometer of the present invention. The numbering of FIGS. 2a-2c is applied in FIG. 4a-4c as appropriate. In the illustrated embodiment, the optical layout of the interferometer has been modified with respect to FIGS. 2a-2c, such that 2α is very close to zero, the reflectors 12 and 13 are missing, and the end reflector consists of two angle reflectors 11a and 11b, whose angle lines are nearly perpendicular to each other. Also due to the significantly higher tolerances in the interferometer of the present invention all the mirrors can be made by using replication technique and this way reduce the manufacturing costs. In this embodiment for the optical layout of the present invention the manufacturing process of the carousel is easy and the size of the interferometer is minimized resulting in very cheap manufacturing cost.

FIGS. 5a-5c illustrate a fourth embodiment for the optical layout of an interferometer of the present invention. The numbering of FIGS. 2a-2c is applied in FIG. 5a-5c as appropriate. In the illustrated embodiment, the optical layout of the interferometer has been modified with respect to FIGS. 4a-4c, such that beamsplitter 10 is located between the two angle reflectors 11a and 11b forming the end reflector. Also in this embodiment for the optical layout of the present invention the manufacturing process of the carousel is easy and the size of the interferometer is minimized resulting in very cheap manufacturing cost. One additional advantage is very compact layout. It should be noted that even if a first rigid structure is not illustrated in figures, the beamsplitter 10 and the end reflectors 11a and 11b are mounted on the first rigid support structure.

An interferometer according to embodiments of the present invention may be used in many different kind of analyzers. One possible analyzer in which the invention can be used is a FTIR (Fourier Transform InfraRed) gas analyzer.

By no means is the invention limited only to the embodiment set forth in the preceding description, but it can be varied within the scope of an inventive concept as defined in the claims. For example, the attitude of the plane reflectors 12 and 13 and the attitude of a beamsplitter and an end reflector, as shown in the embodiments by way of example, can be varied. It is preferable that the beams incident on the end reflector hit the latter from the angle reflectors in a substantially perpendicular to the angle lines of the end reflectors.

The invention claimed is:

1. An interferometer, comprising:
at least a beamsplitter;
at least one end reflector for returning beams; and
a set of reflectors for reflecting the beams between the beamsplitter and the at least one end reflector, said set of reflectors comprises a first and a second angle reflector, constituted by plane reflectors, and said at least one end reflector is a third angle reflector constituted by plane reflectors, and an angle line of the at least one end reflector is arranged perpendicular to an angle line of both of the first and second angle reflector, the first and the second angle reflector being rotatable around an axis.

2. An interferometer as set forth in claim 1, wherein each of the angle reflectors is constituted by two plane reflectors, between which is provided an angle of about 72-107 degrees.

3. An interferometer as set forth in claim 1, wherein the beamsplitter and the at least one end reflector are mounted on a first rigid structure, and the first and the second angle reflectors are mounted on a second rigid structure which is adapted to be rotatable around an axis.

4. An interferometer as set forth in claim 1, wherein said set of reflectors further comprises at least one pair of plane reflectors.

5. An interferometer as set forth in claim 4, wherein the pair of plane reflectors is arranged in such a way that the beams, coming from the beamsplitter to the pair of plane reflectors, travel by way of the first and the second angle reflectors and hit the at least one end reflector perpendicularly to the angle line of the at least one end reflector, the beams reflected from the at least one end reflector returning over the same direction but laterally shifted back to the beamsplitter.

6. An interferometer as set forth in claim 1, wherein the interferometer is arranged in such a way that
a beam to be delivered to the interferometer is conductible to the beamsplitter, the beamsplitter being arranged to divide the beam into a first beam and a second beam,
the first beam is reflected from the beamsplitter to the first angle reflector and further towards the at least one end reflector, and returns from the at least one end reflector over the same direction but laterally shifted back to the beamsplitter,
the second beam passes through the beamsplitter and advances to the second angle reflector and further towards the at least one end reflector, and returns over the same direction but laterally shifted back to the beamsplitter, and
the beamsplitter is arranged to combine the first and second beams returning from the at least one end reflector into a single beam.

7. An interferometer as set forth in claim 4, wherein the pair of plane reflectors comprises a first and a second plane reflector, and wherein the interferometer is arranged in such a way that
a beam to be delivered to the interferometer is conductible to the beamsplitter, the beamsplitter being arranged to divide the beam into a first beam and a second beam,
the first beam is reflected from the beamsplitter to the first plane reflector, from the first plane reflector to the first angle reflector, from the first angle reflector towards the at least one end reflector, and returns from the at least one end reflector over the same direction but laterally shifted back to the beamsplitter,
the second beam passes through the beamsplitter and advances to the second plane reflector and reflects from the second plane reflector to the second angle reflector, from the second angle reflector towards the at least one end reflector, and returns from the at least one end reflector over the same direction but laterally shifted back to the beamsplitter,
the beamsplitter is arranged to combine the first and the second beams returning from the at least one end reflector into a single beam.

8. An interferometer as set forth in claim 1, wherein at least some of the reflectors are produced by replication.

9. An interferometer as set forth in claim 8, wherein the first and the second angle reflectors are comprised of four plane surfaces arranged in one solid body such that a first two of said plane surfaces are perpendicular to each other and a third and a fourth of said plane surfaces are perpendicular to each other, and a reflecting surface is produced to said plane surfaces by replication.

10. A method in an interferometer, comprising:
guiding optical beams through use of a first and a second angle reflector, constituted by plane reflectors, by reflecting the optical beams off the first and the second angle reflector;
guiding the optical beams reflected from the first and the second angle reflector through use of at least one end reflector, constituted by plane reflectors, by reflecting the optical beams off the at least one end reflector, and wherein an angle line of the at least one end reflector is perpendicular to an angle line of both of the first and the second angle reflector; and
changing an optical path difference between the optical beams by rotating the first and the second angle reflector around an axis.

11. An analyzer, comprising:
an interferometer comprising at least a beamsplitter, at least one end reflector for returning beams, and a set of reflectors for reflecting the beams between the beamsplitter and the at least one end reflector, said set of reflectors comprises a first and a second angle reflector, constituted by plane reflectors, and said at least one end reflector is a third angle reflector constituted by plane reflectors, and an angle line of the at least one end reflector is arranged perpendicular to an angle line of both of the first and the second angle reflector, the first and the second angle reflector being rotatable around an axis.

12. An interferometer as set forth in claim 1, wherein each of the angle reflectors is constituted by two plane reflectors, between which is provided an angle of about 85-95 degrees.

13. An interferometer as set forth in claim 1, wherein each of the angle reflectors is constituted by two plane reflectors, between which is provided an angle of about 90 degrees.

* * * * *